(12) United States Patent
Thompson et al.

(10) Patent No.: US 9,628,164 B1
(45) Date of Patent: Apr. 18, 2017

(54) BEAMFORMING ENGINE (71) Applicant: RAYTHEON COMPANY, Waltham, MA (US)

(72) Inventors: Daniel Thompson, Hermosa Beach, CA (US); Harry Marr, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/954,537

(22) Filed: Nov. 30, 2015

(51) Int. Cl.
*H04L 12/933* (2013.01)
*H04B 7/06* (2006.01)

(52) U.S. Cl.
CPC ......... *H04B 7/0667* (2013.01); *H04L 49/101* (2013.01)

(58) Field of Classification Search
CPC ..... H04L 49/101; H04L 45/00; H04L 49/351; H04L 49/15; H04L 49/30; H04L 49/1523; H04L 49/25; H04L 49/1576; H04Q 2213/1304; H04Q 3/68; H04Q 11/0005; H04Q 11/06; H03K 17/693; H04B 1/0483
USPC ................................................. 370/360–375
See application file for complete search history.

(56) References Cited

U.S. PATENT DOCUMENTS

| | | | | |
|---|---|---|---|---|
| 5,565,873 A | * | 10/1996 | Dean .................. | H01Q 1/246 342/372 |
| 5,714,957 A | * | 2/1998 | Searle .................. | H01Q 1/246 342/154 |
| 7,394,424 B1 | | 7/2008 | Jelinek et al. | |
| 8,218,537 B1 | | 7/2012 | Gui et al. | |
| 8,909,174 B2 | * | 12/2014 | Howard .............. | H04B 7/0417 375/267 |
| 2006/0173335 A1 | * | 8/2006 | Shah .................. | G01S 7/52023 600/447 |
| 2006/0178759 A1 | * | 8/2006 | Koehler ............. | H03H 17/0275 700/18 |

OTHER PUBLICATIONS

Chen, Chao-Liang et al.; "A Simplified Signed Powers-of-Two Conversion for Multiplierless Adaptive Filters"; Circuits and Systems; 1996; ISCAS '96; Connecting the World; IEEE International Symposium; vol. 2; pp. 364-367.

Hosangadi, Anup et al.; "Simultaneous Optimization of Delay and Number of Operations in Multiplierless Implementation of Linear Systems"; Proc. of IWLS; 2005; 8pp.

(Continued)

*Primary Examiner* — Vineeta Panwalkar
(74) *Attorney, Agent, or Firm* — Lewis Roca Rothgerber Christie LLP (57) ABSTRACT

A system for beamforming employing true time delay. The system includes a deserializer configured to receive a serial data stream and to convert the serial data stream into a plurality of parallel data streams, a zero-insertion block configured to insert zeroes into each of the parallel data streams, and a crossbar switch having a plurality of inputs and an equal number of outputs. The inputs are connected to the zero-insertion block, each of the outputs corresponding to one of the inputs. The crossbar switch is configured, in a first state, to connect each output to the corresponding input, and in a second state, to connect each output to an input different from the corresponding input, the set of outputs being a circular shift of the set of inputs.

20 Claims, 5 Drawing Sheets

(56) References Cited

OTHER PUBLICATIONS

Kozak, Mücahit et al.; "Digital Phased Array Beamforming Using Single-Bit Delta-Sigma Conversion with Non-Uniform Oversampling"; IEEE Transactions on Ultrasonics, Ferroelectrics, and Frequency Control; vol. 48; No. 4; Jul. 2001; pp. 922-931.
Suarez, Dora et al.; "Multi-Beam RF Aperture Using Multiplierless FFT Approximation"; Electronics Letters 50.24; 2014; 8pp.
International Search Report from corresponding International Application No. PCT/US2016/052097, International Search Report dated Nov. 24, 2016 and mailed Dec. 2, 2016 (4 pgs.).
Written Opinion of the International Searching Authority from corresponding International Application No. PCT/US2016/052097: mailed Dec. 2, 2016 (5 pgs.).

\* cited by examiner

FIG. 5A

BEAMFORMING ENGINE

BACKGROUND

1. Field

One or more aspects of embodiments according to the present invention relate to beam forming, and more particularly to a system for providing true time delay in a computationally efficient manner.

2. Description of Related Art

Beam forming systems may be employed with many-element arrays in high-fidelity radar systems, electronic warfare systems, and communications systems, including communications systems with commercial applications. In such beam forming systems, phase shifters at each element may be used to steer beams and nulls. Due to "beam squint", phase shifters, which in a narrowband approximation may have an effect equivalent to that of time delays, may not be suited for wideband applications. True time delay systems may be used, instead of phase shifters, in systems with high instantaneous bandwidths. True time delay may be implemented in digital approaches utilizing complex digital circuits, including finite impulse response (FIR) filters and circuits for performing convolution operations, which may require significant field programmable gate array (FPGA) resources, such as digital signal processors (DSPs). Such complex digital circuits may in some cases not fit on a single processor.

Thus, there is a need for a system providing true time delay in a computationally efficient manner.

SUMMARY

According to an embodiment of the present invention there is provided a system for beamforming, including: a deserializer configured to receive a serial data stream and to convert the serial data stream into a plurality of parallel data streams; a zero-insertion block configured to insert zeroes into each of the parallel data streams; and a crossbar switch having a plurality of inputs and an equal number of outputs, the inputs being connected to the zero-insertion block, each of the outputs corresponding to one of the inputs, the crossbar switch being configured: in a first state, to connect each output to the corresponding input, and in a second state, to connect each output to a respective alternate input different from the corresponding input, the set of alternate inputs being related to the set of corresponding inputs by a circular shift.

In one embodiment, the crossbar switch includes p multiplexers, p being the number of inputs and the number of outputs of the crossbar switch, each multiplexer having: p inputs connected to respective inputs of the crossbar switch, and one output, the output of each multiplexer being connected to a respective output of the crossbar switch.

In one embodiment, the multiplexers are configured to operate in p states, wherein in the kth state of the p states, the kth input of each multiplexer is selected.

In one embodiment, the system includes a system clock, wherein in the second state, the crossbar switch is configured to connect an output of the crossbar switch to an input of the crossbar switch through a delay block configured to delay a signal by one cycle of the system clock.

In one embodiment, the system includes a major delay block configured to delay each of the parallel data streams by a major delay, the major delay being adjustable in increments of 1 cycle of the system clock.

In one embodiment, the major delay block includes a first-in-first-out data structure.

In one embodiment, the zero-insertion block includes a plurality of multiplexers, each of the plurality of multiplexers having two inputs and one output, a first input of each multiplexer being connected to a respective data stream of the plurality of parallel data streams, and a second input of each multiplexer being connected to a constant zero value.

In one embodiment, the system includes a polyphase digital downconverter having an input and an output, the polyphase digital downconverter being configured to: receive, at its input, an input signal, and to generate, at its output, a signal that is the input signal shifted in frequency.

In one embodiment, the polyphase digital downconverter includes: a first digital local oscillator configured to generate a signal with a first phase, and a second digital local oscillator configured to generate a signal with a second phase differing from the first phase by about 90 degrees.

In one embodiment, the polyphase digital downconverter further includes: a first multiplier configured to multiply the input signal by the signal with the first phase to form an in phase signal; a first lowpass filter configured to filter the in phase signal; a second multiplier configured to multiply the input signal by the signal with the second phase to form quadrature signal; and a second lowpass filter configured to filter the quadrature signal.

According to an embodiment of the present invention there is provided a receiver including: an array antenna including a plurality of antenna elements; a plurality of analog to digital converters, each connected to a respective antenna element of the plurality of antenna elements; a deserializer configured to receive a serial data stream from an analog to digital converter of the plurality of analog to digital converters, and to convert the serial data stream into a plurality of parallel data streams; a zero-insertion block configured to insert zeroes into each of the parallel data streams; and a crossbar switch having a plurality of inputs and an equal number of outputs, the inputs being connected to the zero-insertion block, each of the outputs corresponding to one of the inputs, the crossbar switch being configured: in a first state, to connect each output to the corresponding input, and in a second state, to connect each output to a respective alternate input different from the corresponding input, the set of alternate inputs being related to the set of corresponding inputs by a circular shift.

In one embodiment, the crossbar switch includes p multiplexers, p being the number of inputs and the number of outputs of the crossbar switch, each multiplexer having: p inputs connected to respective inputs of the crossbar switch, and one output, the output of each multiplexer being connected to a respective output of the crossbar switch.

In one embodiment, the multiplexers are configured to operate in p states, wherein in the kth state of the p states, the kth input of each multiplexer is selected.

In one embodiment, the system includes a system clock, wherein in the second state, the crossbar switch is configured to connect an output of the crossbar switch to an input of the crossbar switch through a delay block configured to delay a signal by one cycle of the system clock.

In one embodiment, the system includes a major delay block configured to delay each of the parallel data streams by a major delay, the major delay being adjustable in increments of 1 cycle of the system clock.

In one embodiment, the zero-insertion block includes a plurality of multiplexers, each of the plurality of multiplexers having two inputs and one output, a first input of each multiplexer being connected to a respective data stream of the plurality of parallel data streams, and a second input of each multiplexer being connected to a constant zero value.

In one embodiment, the system includes a polyphase digital downconverter having an input and an output, the polyphase digital downconverter being configured to: receive, at its input, an input signal, and to generate, at its output, a signal that is the input signal shifted in frequency.

In one embodiment, the polyphase digital downconverter includes: a first digital local oscillator configured to generate a signal with a first phase, and a second digital local oscillator configured to generate a signal with a second phase differing from the first phase by about 90 degrees.

In one embodiment, the polyphase digital downconverter further includes: a first multiplier configured to multiply the input signal by the signal with the first phase to form an in phase signal; a first lowpass filter configured to filter the in phase signal; a second multiplier configured to multiply the input signal by the signal with the second phase to form quadrature signal; and a second lowpass filter configured to filter the quadrature signal.

In one embodiment, the system includes: a plurality of crossbar switches including the crossbar switch; and a summing circuit configured to feed a polyphase sum of the outputs of the crossbar switches to the input of the polyphase digital downconverter, wherein the signal at the output of the polyphase digital downconverter corresponds to a beam formed to extend in a first direction.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a beamforming engine provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
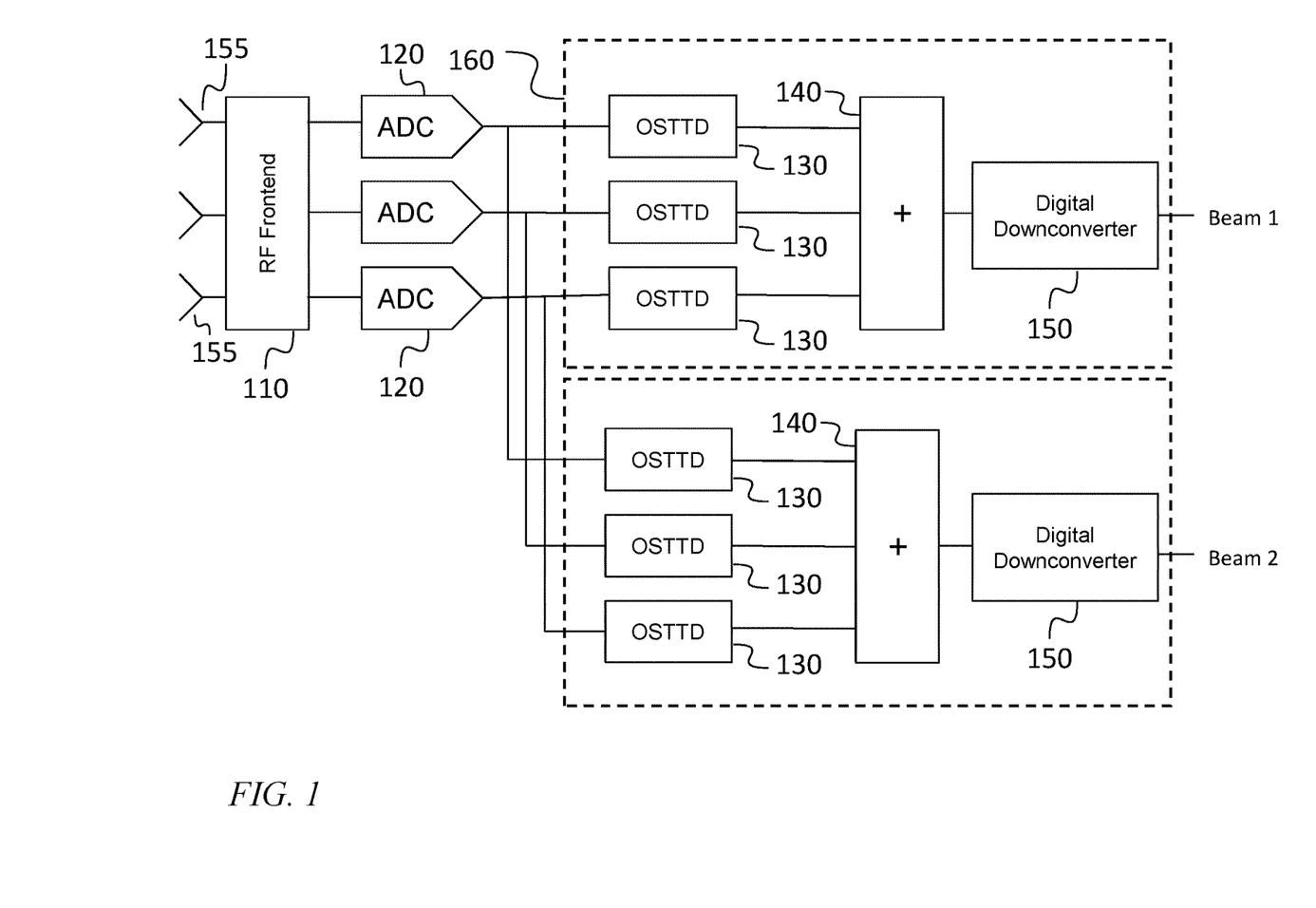
FIG. 1 is a block diagram of a beam former according to an embodiment of the present invention.

Referring to FIG. 1, in one embodiment a beam former includes a radio frequency (RF) front end 110, a bank of analog to digital converters 120, a bank of oversampled true time delay (OSTTD) circuits 130, a summing circuit 140, and a polyphase digital downconverter (or "polyphased decimation filter") 150. The RF front end 110 may be connected to a plurality of antenna elements 155 that are part of an array antenna. The RF front end 110 may include, for example, a plurality of low noise amplifiers, each connected to a respective antenna element 155 of the array antenna. The RF front end 110 may have a plurality of outputs (e.g., each output being the output of a respective low noise amplifier), and each of the outputs of the RF front end may be connected to a respective analog to digital converter (ADC) 120. The output of each ADC 120 may feed each of a plurality of beam formers 160, each of which may generate a receive beam, i.e., an output containing an intermediate frequency (IF) or baseband representation of a signal received in a respective receive beam, the receive beam being an antenna pattern synthesized by forming a linear combination of the signals from the antenna elements 155. As used herein, the terms radio frequency and RF refer to the frequency band of electromagnetic waves propagating in free space, and, as such, may include a frequency range extending from, e.g., 1 MHz, to microwave frequencies and millimeter wave frequencies.

Each beam former 160 may include a plurality of time delay circuits or OSTTD circuits 130, each connected to a respective ADC, and each serving to apply a time delay to a signal from one of the antenna elements 155. The outputs of the time delay circuits may be connected to a summing circuit, the output of which may be connected to a polyphase digital downconverter 150.

Figure 2:
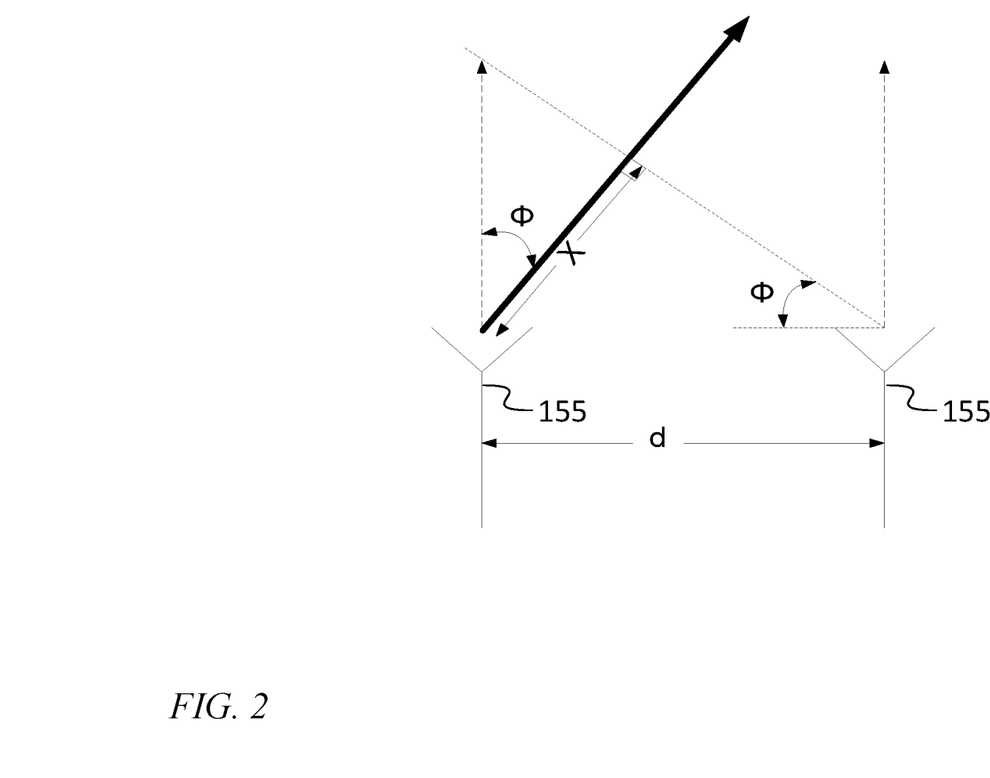
FIG. 2 is an illustration showing a relationship between time delay and beam direction according to an embodiment of the present invention.

Referring to FIG. 2, the time delay applied by each time delay circuit may be determined according to the time delay equations:

$$X = d \sin(\Phi), \text{ and}$$

$$\text{Time Delay} = X/c = d/c \sin(\Phi),$$

where $\Phi$ is the beam pointing direction, d is the separation between adjacent antenna elements 155, c is the speed of light, and Time Delay is the difference between the time delay applied to adjacent antenna elements 155.

Related art beam formers may provide time delay by interpolating using finite impulse response (FIR) filters (referred to as "interpolating FIR filters"). These may provide true time delay or approximate true time delay, but may be computational costly, requiring for example that multiplications be performed.

Figure 3:
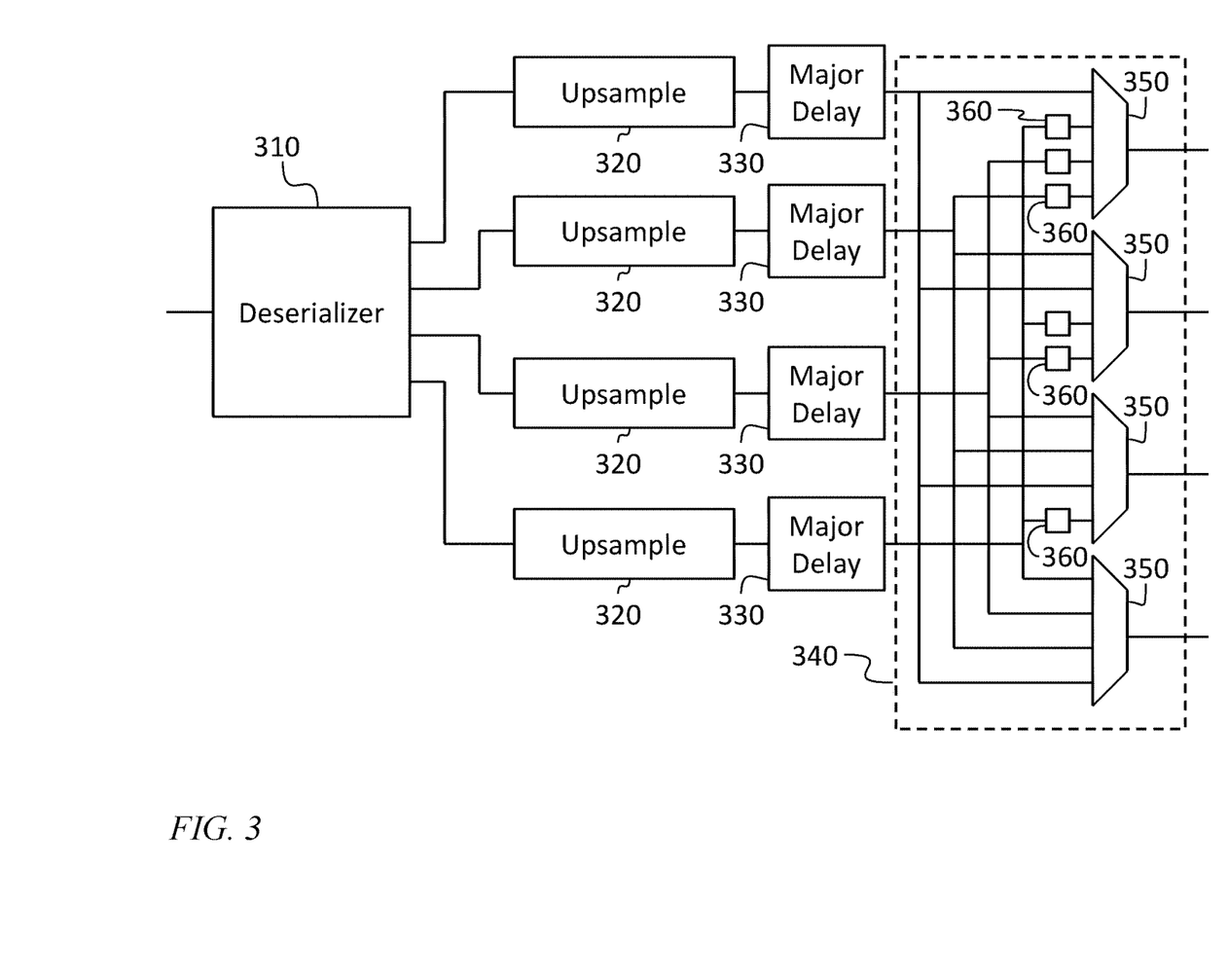
FIG. 3 is a block diagram of an oversampled true time delay according to an embodiment of the present invention.

Referring to FIG. 3, in one embodiment a beam former provides coarse and fine delay of a data stream without employing multiplications. A deserializer 310 receives a serial data stream, and rearranges the received serial data stream into a plurality of parallel data streams, e.g., p parallel data streams, where p is a positive integer greater than 1. The serial data stream may consist of samples of a high speed ADC, and the output of the serializer may include the same samples, transmitted on, for example, four parallel data paths that may be referred to as "polyphases", each data path carrying data at a lower rate than the input of the deserializer. This approach, which may be referred to as "polyphasing" the signal, may allow the processing circuit (e.g., an FPGA) to process the data at the same sampling rate as (or at a higher sampling rate than) the sampling rate of the ADC, while operating at a lower clock rate than the sampling rate of the ADC. In each of the parallel data paths, an upsampling circuit 320 may then insert zeros, so that the data rate at the output of each upsampling circuit 320 is higher than the data rate at its input. Each upsampling circuit 320 output may be connected to a major delay (or "coarse delay") circuit 330. The major delay circuit 330 may consist of a first-in-first-out (FIFO) data structure implementing a variable delay. For example, the FIFO may be implemented as a memory with a first pointer pointing to the input of the FIFO and a second pointer pointing to the output of the FIFO. The first pointer may be advanced whenever the FIFO is written and the second pointer may be advanced whenever the FIFO is read, each pointer wrapping around to the bottom of the memory after it reaches the top of the memory. The separation between the pointers may represent the delay, and it may be adjustable by advancing, after a read or write, one of the pointers by an amount that is greater than or less than the size of one data word.

The p outputs of the p major delay circuits may be connected to p respective inputs of a crossbar switch 340 also having p outputs and used to provide fine delay control. In a first state, the crossbar switch acts as a pass-through. In this state, each input is connected to the corresponding output, i.e., the first input is connected to the first output, the second input is connected to the second output, and so on. The outputs of the crossbar switch are the outputs of the OSTTD circuit. The crossbar switch may be implemented using p p-way multiplexers (e.g., four 4-way multiplexers 350 as illustrated in FIG. 3), with a common control signal, so that if, for example, the first multiplexer is set to select its first input, the remaining multiplexers are also each set to select their respective first inputs.

Each output of each OSTTD circuit may be summed, in a summing circuit 140 (FIG. 1), with M−1 corresponding outputs of M−1 other OSTTD circuits, where M is the number of ADCs 120 feeding the beam former. Each of the M OSTTD circuits may apply a different delay to the signals it processes, and the set of M delays applied may determine the beam direction as described with respect to FIG. 2. The output of the summing circuit may then also include p parallel data paths, representing the sum signal. This sum signal may be processed by a polyphase digital downconverter 150 to form an IF or baseband signal corresponding to the beam.

The p parallel data paths at various points in the circuit may contain, at any time, p samples corresponding to points in time separated by T/p where T is the time between consecutive samples in any one of the p parallel data paths, i.e., T may be the period of a system clock distributed within the circuit or FPGA. Accordingly the crossbar switch may apply a fine delay of T/p by connecting the first input to the second output, connecting the second input to the third output, and so on, up to the last input which may be connected, through a one-cycle delay 360 (i.e., a delay of one clock cycle, or a delay of T) to the first output. Additional increments of fine delay may be applied by connecting the inputs to the outputs in other permutations that are circular shifts with offsets of more than 1. When the offset is greater than 1, the number of paths to which a one-cycle delay is added is equal to the offset of the circular shift.

In other words, the signal is first deserialized into p parallel paths, such that if the system clock rate is X Hz, the total sampling rate of the signal is now pX Hz. To control the delay of the signal, a control word is applied to signify the number of partial or whole system clock cycle delays to be applied to the signal. Of these bits, the $\log_2(p)$ LSB bits represent 1/p clock cycle delays, which are implemented by a multiplexer selecting different arrangements of the p polyphase signals. These delays represent 1/p of the period of the X Hz system clock e.g. a minimum delay is achievable of 1/pX. The MSB bits of the major delay value represent full clock delays, or 1/X. M MSB bits indicate there may be between $0-2^{M-1}$ clock delays. The major delay can be implemented with a dual port block ram that is written to and read from some number of clock cycles later to implement the full system clock cycle delays, followed by a multiplexer network to implement the partial system clock cycle delays.

The network feeding the four 4-way multiplexers 350 in FIG. 3 (showing an embodiment in which p=4) provides a selectable circular shift, from the inputs to the outputs. The multiplexers may be controlled so that they operate together in any of four states. In a first state, the first input of each multiplexer is selected; in a second state, the second input of each multiplexer is selected; in a third state, the third input of each multiplexer is selected; and in a fourth state, the fourth input of each multiplexer is selected. In the first state, when each of the four multiplexers is set to select the first input, the crossbar switch 340 acts as a pass-through, because the first input of the first multiplexer 350 is connected to the first input of the crossbar switch 340, the first input of the second multiplexer 350 is connected to the second input of the crossbar switch 340, the first input of the third multiplexer 350 is connected to the third input of the crossbar switch 340, and the first input of the fourth multiplexer 350 is connected to the fourth input of the crossbar switch 340.

In the second state, when each of the four multiplexers is set to select the second input, the crossbar switch 340 provides a circular shift with an offset of one, because the second input of the first multiplexer 350 is connected to the fourth input of the crossbar switch 340, the second input of the second multiplexer 350 is connected to the first input of the crossbar switch 340, the second input of the third multiplexer 350 is connected to the second input of the crossbar switch 340, and the second input of the fourth multiplexer 350 is connected to the third input of the crossbar switch 340. Similarly, in the third state, the crossbar switch 340 provides a circular shift with an offset of two, and in the fourth state, the crossbar switch 340 provides a circular shift with an offset of three.

A detailed example may be used to illustrate the operation of one embodiment according to FIG. 3; as will be understood by those of skill in the art, the invention is not limited to this embodiment. The ADCs may each operate at a sampling rate of 1 gigasample per second (1 GS/s) and the beam formers 160 may be implemented in an FPGA operating, except for the deserializer 310 (which may operate at 1 GHz, to read the data received from the ADC) at a clock rate of 500 MHz. The deserializer 310 may generate four parallel data streams, each operating at a rate of 250 megasamples per second (250 MS/s). Each upsampling circuit 320 may insert a zero after each sample, outputting a stream of alternating samples and zeros at a total data rate of 500 MS/s. If the ADC samples are numbered starting with 1, so that the series of samples may be referred to as $S_1$, $S_2$, $S_3$, and so on, then the output of the first upsampling circuit 320 may be $S_1$, 0, $S_5$, 0, $S_9$, and so on, and the output of the second upsampling circuit 320 may be $S_2$, 0, $S_6$, 0, $S_{10}$, and so on. Because the clock frequency of the FPGA is 500 MHz, a major delay (T) may be 2 nanoseconds (ns), and because there are four parallel data paths, the fine or "minor" delay increment may be 0.5 ns.

In one embodiment, the deserializer 310 is a dedicated circuit on the FPGA chip capable at running at 1 GHz, and operating, for example, as a receiver following the JESD204B standard. The deserializer 310 may be hard-wired (i.e., constructed of non-programmable logic) and therefore capable of operating at a higher clock rate than other parts of the FPGA.

Figure 4:
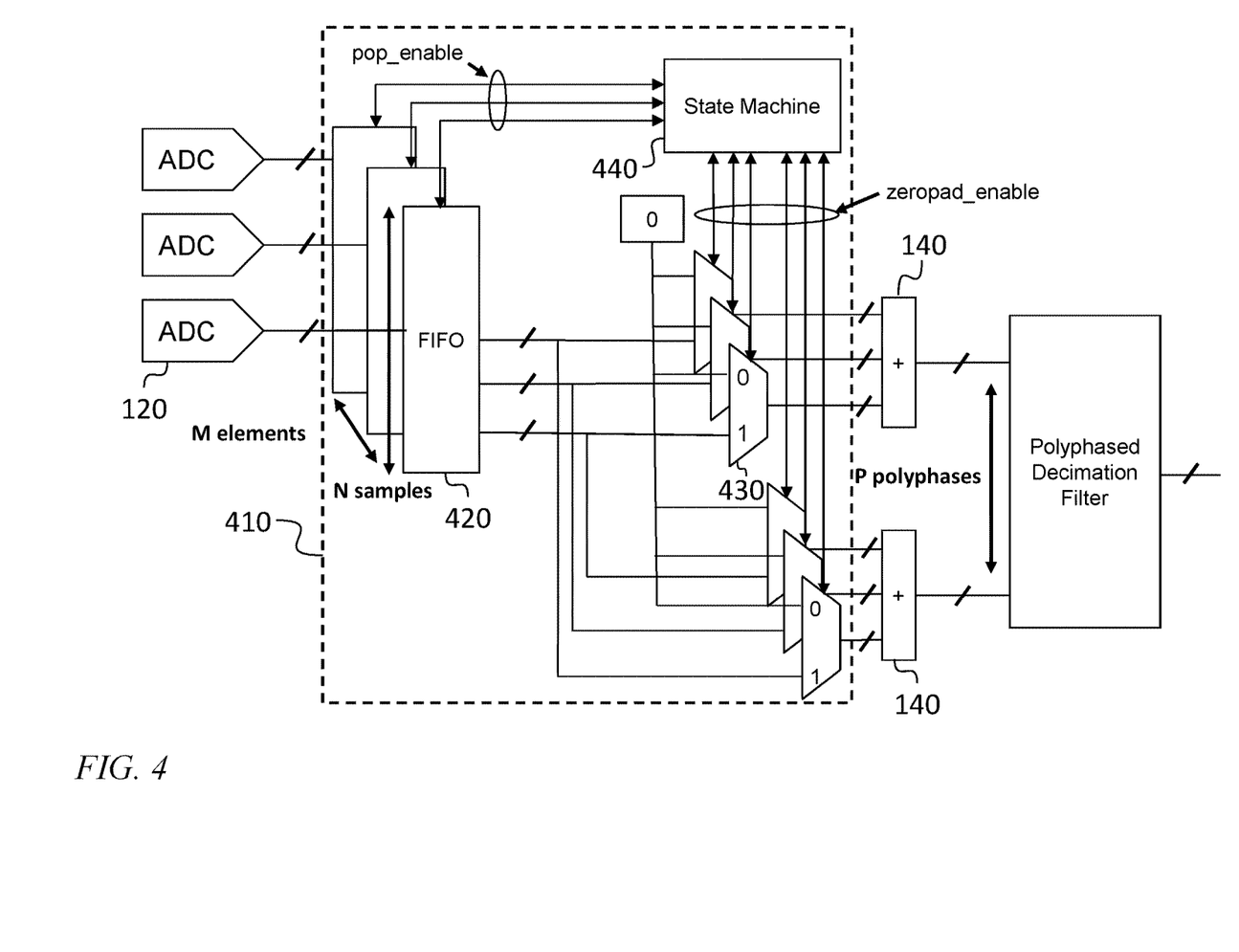
FIG. 4 is a block diagram of a beam former according to an embodiment of the present invention.

Referring to FIG. 4, in one embodiment the functions of the upsampling circuit 320 and of the major delay circuit 330 may be combined into an upsampling and delay circuit 410 as shown. As in the embodiment of FIG. 3, the data stream from each ADC is deserialized by a deserializer 310 (not shown in FIG. 4) into p parallel data streams; each of the p parallel data streams is then fed into a FIFO 420 (each of the blocks labeled "FIFO" in FIG. 4 includes p FIFO structures arranged in parallel). Each parallel data path at the output of each FIFO is fed to a first input of a respective two-way multiplexer, the second input of which is connected to the constant 0. Each multiplexer block 430 of FIG. 4 represents a bank of p parallel multiplexers, controlled in tandem. A state machine 440 controls both the FIFOs and the multiplexers, to effect both upsampling (i.e., zero insertion) and major delay. For example, if the output of the first multiplexer, when no major delay is applied, starting at a third clock cycle of the FPGA, is $S_5$, 0, $S_9$, 0, and so on, then to generate a major delay of one clock cycle (e.g., 2 ns for an FPGA clock frequency of 500 MHz), the state machine may control the first FIFO and the first multiplexer so that the output of the first multiplexer is 0, $S_5$, 0, $S_9$, and so on. The remainder of the circuit may be as in FIG. 3, e.g., the output of the upsampling and delay circuit 410 may be sent to a crossbar switch 340 (not shown in FIG. 4), to a summing circuit 140, and to a polyphase digital downconverter 150.

Figure 5A:
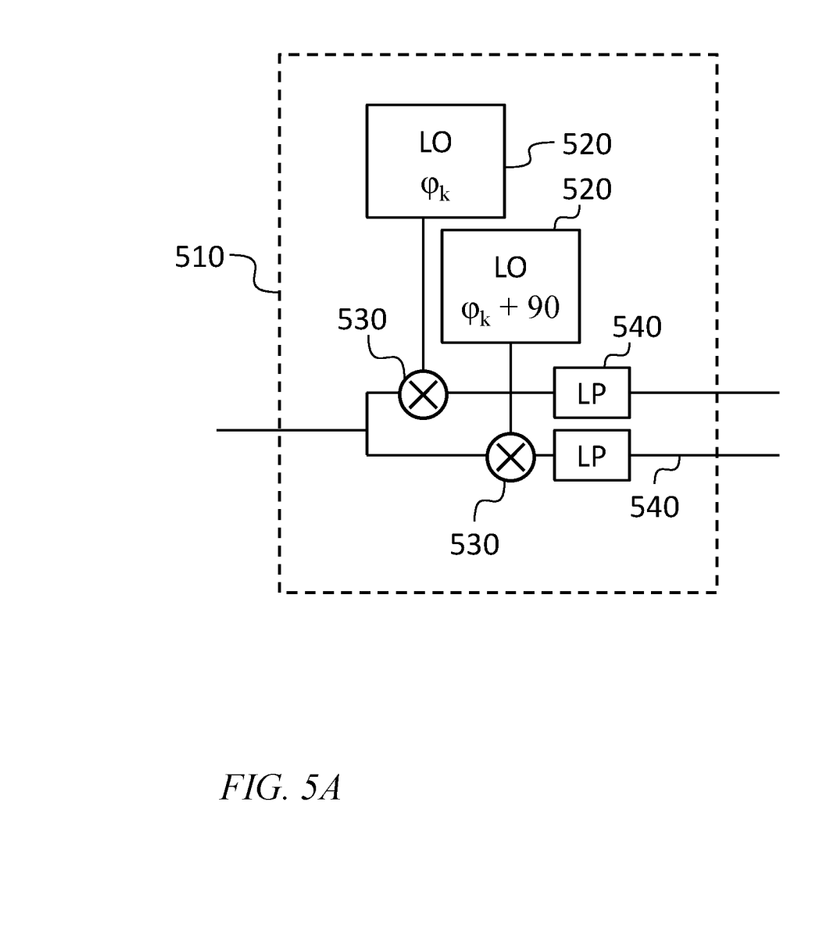
FIG. 5A is a block diagram of a digital downconverter according to an embodiment of the present invention.

Referring to FIG. 5A, in one embodiment each polyphase digital downconverter 150 may include p digital downconverter circuits 510, each of which may include two local oscillators 520 (e.g., sine wave generators) with phase offsets of $\phi_k$ and $\phi_k+90°$ degrees, respectively, where k is the index of the parallel data stream, and takes a value between 1 and p, and $\phi_k$ may be proportional to k−1. Each local oscillator supplies one input of a multiplier 530, the other input of which is the delayed, upsampled RF signal produced by the OSTTD circuit 130. The output of each multiplier is filtered by a low-pass filter 540. In the embodiment of FIG. 5A, the output of each digital downconverter circuit 510 may be a baseband signal including in-phase and quadrature components. In other embodiments each output may be a single IF signal.

As mentioned above, each in-phase local oscillator may have a phase corresponding to the parallel data path with which it is associated, with the phase of the in-phase local oscillators for two adjacent data paths differing by 360/p degrees, for example. Each local oscillator may be implemented, for example, as a lookup table.

Figure 5B:
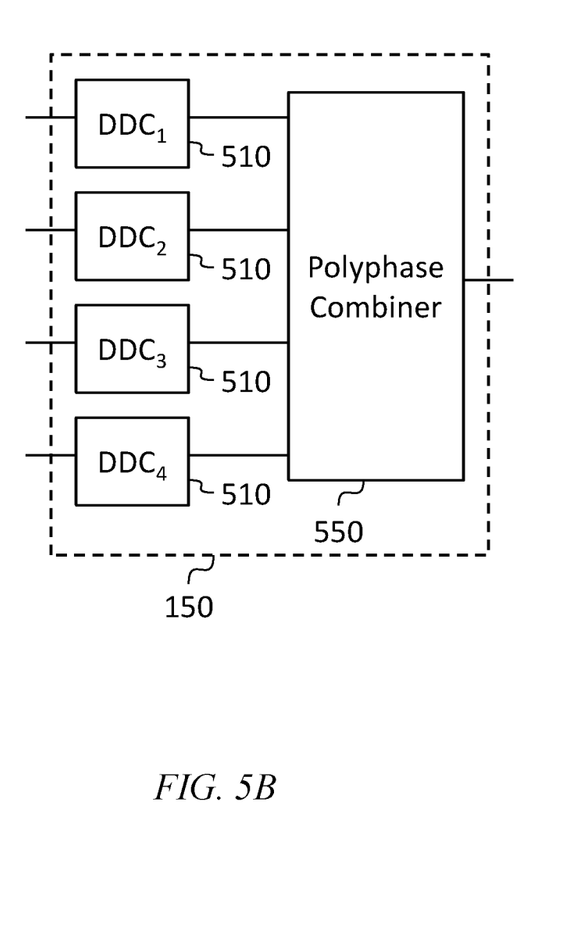
FIG. 5B is a block diagram of a plurality of digital downconverters and a polyphase combiner according to an embodiment of the present invention.

Referring to FIG. 5B, in one embodiment the polyphase digital downconverter 150 may include p (e.g., 4) digital downconverter circuits 510 and a polyphase combiner 550. The polyphase combiner may include interpolating filters and a summing circuit, for merging the four polyphase data streams into one data stream that is the output corresponding to the beam.

It will be understood that when an element or layer is referred to as being "connected to", or "coupled to" another element, it may be directly connected to or coupled to the other element, or one or more intervening elements may be present. In contrast, when an element is referred to as being "directly connected to" or "directly coupled to" another element, there are no intervening elements present. Although limited embodiments of a beamforming engine have been specifically described and illustrated herein, many modifications and variations will be apparent to those skilled in the art. Accordingly, it is to be understood that a beamforming engine employed according to principles of this invention may be embodied other than as specifically described herein. The invention is also defined in the following claims, and equivalents thereof.

What is claimed is:

1. A system for beamforming, comprising:
    a deserializer configured to receive a serial data stream and to convert the serial data stream into a plurality of parallel data streams;
    a zero-insertion circuit configured to insert zeroes into each of the parallel data streams; and
    a crossbar switch having a plurality of inputs and an equal number of outputs, the inputs being connected to the zero-insertion circuit, each of the outputs corresponding to one of the inputs, the crossbar switch being configured:
    in a first state, to connect each output to the corresponding input, and
    in a second state, to connect each output to a respective alternate input different from the corresponding input, the set of alternate inputs being related to the set of corresponding inputs by a circular shift.

2. The system of claim 1, wherein the crossbar switch comprises p multiplexers, p being the number of inputs and the number of outputs of the crossbar switch, each multiplexer having:
    p inputs connected to respective inputs of the crossbar switch, and
    one output,
    the output of each multiplexer being connected to a respective output of the crossbar switch,
    wherein p is an integer greater than 1.

3. The system of claim 2, wherein the multiplexers are configured to operate in p states, wherein in the $k^{th}$ state of the p states, the $k^{th}$ input of each multiplexer is selected, wherein k is an integer greater than or equal to 1 and less than or equal to p.

4. The system of claim 1, further comprising a system clock, wherein in the second state, the crossbar switch is configured to connect an output of the crossbar switch to an input of the crossbar switch through a delay circuit configured to delay a signal by one cycle of the system clock.

5. The system of claim 4, further comprising a major delay circuit configured to delay each of the parallel data streams by a major delay, the major delay being adjustable in increments of 1 cycle of the system clock.

6. The system of claim 5, wherein the major delay circuit comprises a first-in-first-out data structure.

7. The system of claim 1, wherein the zero-insertion circuit comprises a plurality of multiplexers, each of the plurality of multiplexers having two inputs and one output, a first input of each multiplexer being connected to a respective data stream of the plurality of parallel data streams, and a second input of each multiplexer being connected to a constant zero value.

8. The system of claim 1, further comprising a polyphase digital downconverter having an input and an output, the polyphase digital downconverter being configured to:
    receive, at its input, an input signal, and
    to generate, at its output, a signal that is the input signal shifted in frequency.

9. The system of claim 8, wherein the polyphase digital downconverter comprises:
    a first digital local oscillator configured to generate a signal with a first phase, and
    a second digital local oscillator configured to generate a signal with a second phase differing from the first phase by about 90 degrees.

10. The system of claim 9, wherein the polyphase digital downconverter further comprises:
- a first multiplier configured to multiply the input signal by the signal with the first phase to form an in phase signal;
- a first lowpass filter configured to filter the in phase signal;
- a second multiplier configured to multiply the input signal by the signal with the second phase to form quadrature signal; and
- a second lowpass filter configured to filter the quadrature signal.

11. A receiver comprising:
- an array antenna comprising a plurality of antenna elements;
- a plurality of analog to digital converters, each connected to a respective antenna element of the plurality of antenna elements;
- a deserializer configured to receive a serial data stream from an analog to digital converter of the plurality of analog to digital converters, and to convert the serial data stream into a plurality of parallel data streams;
- a zero-insertion circuit configured to insert zeroes into each of the parallel data streams; and
- a crossbar switch having a plurality of inputs and an equal number of outputs, the inputs being connected to the zero-insertion circuit, each of the outputs corresponding to one of the inputs, the crossbar switch being configured:
  - in a first state, to connect each output to the corresponding input, and
  - in a second state, to connect each output to a respective alternate input different from the corresponding input, the set of alternate inputs being related to the set of corresponding inputs by a circular shift.

12. The receiver of claim 11, wherein the crossbar switch comprises p multiplexers, p being the number of inputs and the number of outputs of the crossbar switch, each multiplexer having:
- p inputs connected to respective inputs of the crossbar switch, and
- one output,
- the output of each multiplexer being connected to a respective output of the crossbar switch,
- wherein p is an integer greater than 1.

13. The receiver of claim 12, wherein the multiplexers are configured to operate in p states, wherein in the $k^{th}$ state of the p states, the $k^{th}$ input of each multiplexer is selected, wherein k is an integer greater than or equal to 1 and less than or equal to p.

14. The receiver of claim 11, further comprising a system clock, wherein in the second state, the crossbar switch is configured to connect an output of the crossbar switch to an input of the crossbar switch through a delay circuit configured to delay a signal by one cycle of the system clock.

15. The system of claim 14, further comprising a major delay circuit configured to delay each of the parallel data streams by a major delay, the major delay being adjustable in increments of 1 cycle of the system clock.

16. The receiver of claim 11, wherein the zero-insertion circuit comprises a plurality of multiplexers, each of the plurality of multiplexers having two inputs and one output, a first input of each multiplexer being connected to a respective data stream of the plurality of parallel data streams, and a second input of each multiplexer being connected to a constant zero value.

17. The receiver of claim 11, further comprising a polyphase digital downconverter having an input and an output, the polyphase digital downconverter being configured to:
- receive, at its input, an input signal, and
- to generate, at its output, a signal that is the input signal shifted in frequency.

18. The receiver of claim 17, wherein the polyphase digital downconverter comprises:
- a first digital local oscillator configured to generate a signal with a first phase, and
- a second digital local oscillator configured to generate a signal with a second phase differing from the first phase by about 90 degrees.

19. The receiver of claim 18, wherein the polyphase digital downconverter further comprises:
- a first multiplier configured to multiply the input signal by the signal with the first phase to form an in phase signal;
- a first lowpass filter configured to filter the in phase signal;
- a second multiplier configured to multiply the input signal by the signal with the second phase to form quadrature signal; and
- a second lowpass filter configured to filter the quadrature signal.

20. The receiver of claim 17, comprising:
- a plurality of crossbar switches including the crossbar switch; and
- a summing circuit configured to feed a polyphase sum of the outputs of the crossbar switches to the input of the polyphase digital downconverter,
- wherein the signal at the output of the polyphase digital downconverter corresponds to a beam formed to extend in a first direction.

* * * * *